(12) United States Patent
Cline (10) Patent No.: US 11,284,193 B2
(45) Date of Patent: Mar. 22, 2022

(54) AUDIO ENHANCEMENT SYSTEM FOR ARTISTIC WORKS

(71) Applicant: Laurie Cline, Boca Raton, FL (US)

(72) Inventor: Laurie Cline, Boca Raton, FL (US)

( * ) Notice: Subject to any disclaimer, the term of this patent is extended or adjusted under 35 U.S.C. 154(b) by 0 days.

(21) Appl. No.: 16/871,310

(22) Filed: May 11, 2020

(65) Prior Publication Data
US 2021/0250687 A1    Aug. 12, 2021

Related U.S. Application Data

(60) Provisional application No. 62/972,582, filed on Feb. 10, 2020.

(51) Int. Cl.
| H04R 3/12 | (2006.01) |
| H04R 1/02 | (2006.01) |
| H04W 4/80 | (2018.01) |

(52) U.S. Cl.
CPC ............... *H04R 3/12* (2013.01); *H04R 1/025* (2013.01); *H04R 1/028* (2013.01); *H04W 4/80* (2018.02)

(58) Field of Classification Search
CPC .......... H04R 3/12; H04R 1/025; H04R 1/028; H04W 4/80
See application file for complete search history.

(56) References Cited

U.S. PATENT DOCUMENTS

| 6,020,868 | A | * | 2/2000 | Greene | ................ G09G 3/20 345/88 |
| 8,456,293 | B1 | | 6/2013 | Trundle et al. | |
| 8,525,665 | B1 | | 9/2013 | Trundle et al. | |
| 8,659,417 | B1 | | 2/2014 | Trundle et al. | |
| 9,503,539 | B1 | | 11/2016 | Trundle et al. | |
| 9,646,587 | B1 | * | 5/2017 | Becker | ................. G10H 1/0025 |
| 9,854,050 | B1 | | 12/2017 | Trundle et al. | |
| 10,356,192 | B1 | * | 7/2019 | Trundle | ................. H04L 67/12 |
| 10,515,615 | B2 | * | 12/2019 | Elkins | ................. G10H 1/0025 |
| 2003/0057884 | A1 | * | 3/2003 | Dowling | ................. A61N 5/06 315/291 |
| 2003/0066073 | A1 | * | 4/2003 | Rebh | ................. G09F 19/228 725/12 |
| 2006/0044215 | A1 | * | 3/2006 | Brody | ................. H01L 27/3276 345/1.3 |
| 2007/0229467 | A1 | * | 10/2007 | Sakai | ................. G11B 19/025 345/173 |
| 2009/0213572 | A1 | * | 8/2009 | Benson | ................. G09F 21/02 362/97.1 |
| 2011/0279487 | A1 | * | 11/2011 | Imamura | ................. G09G 3/342 345/690 |
| 2015/0207878 | A1 | * | 7/2015 | Cuzzort | ................. G06F 3/1454 345/2.2 |
| 2015/0370528 | A1 | * | 12/2015 | Flaks | ................. G06F 3/017 700/94 |
| 2017/0220310 | A1 | * | 8/2017 | Hochman | ................. G06F 3/147 |
| 2017/0344330 | A1 | * | 11/2017 | Masumoto | ............. G06F 3/1431 |
| 2020/0225903 | A1 | * | 7/2020 | Cohen | ................. G06F 3/1446 |

\* cited by examiner

*Primary Examiner* — Oyesola C Ojo (74) *Attorney, Agent, or Firm* — John C. Smith (57) ABSTRACT

An audio enhancement system that is incorporated into displays used for artwork and educational items. The system detects when an individual is in proximity of the displayed work, and outputs audio information related to the artwork or educational item if in question. Audio data can be stored locally or in a remote system.

9 Claims, 6 Drawing Sheets

AUDIO ENHANCEMENT SYSTEM FOR ARTISTIC WORKS

BACKGROUND OF THE INVENTION

Technical Field

The invention is related to artworks and education, including paintings, sculptures, historical artifacts, and other physical works created for aesthetic and/or educational purposes. In particular, it relates to an intelligent audio enhancement system that works in conjunction with a particular work of art. It uses a motion detector to first detect the presence of an individual observing the art work when the individual is within a predetermined distance from the artwork. Once an individual is detected, the audio enhancement system then provides audio information or sounds related to the art work such that the individual is provided a broader and more complete appreciation of the art work or other item in question.

Background

Currently, art galleries and museums provide extensive collections of art works for display to the public. These art works take a variety of forms, such as paintings, sculptures, and other aesthetically pleasing works. Patrons viewing the art works frequently spend only a limited amount of time at each work and often miss out on the nuances inherent in the works as well as other information that would be impossible to convey by the art work itself. It would be desirable to have a method of enhancing the artwork with additional related information that would broaden and enhance the art patron's experience, knowledge, and enjoyment.

In addition, museums and art galleries typically prefer to display works of art without unnecessary items that may distract the viewer. In particular, it is better when displaying artwork of any kind to have a minimum amount of extraneous equipment that may distract the viewer. As such, it would be desirable to have the ability to enhance appreciation of a particular artwork by adding functionality without distracting from the artwork by minimizing the appearance of any additional equipment used to augment the artwork on display.

In addition to minimizing any distractions that might be created by additional equipment, such as audio equipment, it is also important to ensure that any additional equipment used to enhance display of the artwork or other items do not require excessive installation or maintenance costs, as well as providing an efficient and easy to implement the process of updating any information provided by the additional equipment.

While the prior art has provided a variety of ways to publicly display art and other works, it has failed to provide expanded and in-depth information related to each work of art. It would be desirable to have a method of displaying the art and providing related audio information such that a variety of information is made available to the art patron to expand the patron's appreciation of the art.

SUMMARY OF THE INVENTION

The present invention provides an audio enhancement system that is incorporated into, or used in conjunction with, public displays of artwork and other items. The system uses a local sensor/motion detector adjacent to an item of artwork to detect when an individual is in a predetermined distance from a particular displayed artwork. An audio output is also provided to output audio data under control of the local sensor/motion detector. In the preferred embodiment, the audio output is integrated with the local sensor/motion detector. Once detected, the system outputs audio information related to the artwork in question. The audio information can be distributed to audio outputs used in conjunction with a particular item of artwork by any suitable means, such as streaming audio data via hardwired or Ethernet connection to a remote system, streaming audio data via WIFI or Bluetooth connection from a remote system. Alternatively, it can be downloaded to the local sensor/motion detector during initial installation: item of artwork in a museum or gallery.

DESCRIPTION OF THE PREFERRED EMBODIMENT

Prior to a detailed discussion of the figures, a general overview of the invention will be presented.

For ease of discussion, the specification uses the term "artwork." However, the term "artwork" as used herein refers to not only artwork such as paintings, and sculptures, it also refers to any item that the audio enhancement system supports for artistic, and/or educational purposes. For example, the audio system can also be used to enhance understanding of items on display in a museum other than one that focuses on artwork, such as a natural history museum.

The invention provides audio enhancement for any item of artwork with which it is used. The preferred embodiment uses a motion detector or thermal sensor to detect when an individual is standing before the artwork. For ease of discussion, the term "motion detector" will be used to describe a motion detector or a thermal sensor. In the preferred embodiment, the motion detector senses the presence of an individual when the individual is in front of the artwork and is within a predetermined distance of the artwork. Once detected, the system outputs audio data specifically related to that item of artwork. As a result, the individual is provided with additional information or sounds that may not be apparent solely by viewing the artwork. For example, information related to the sounds the subject in the painting may make, information related to the artist, information related to the time period that may be relevant to the artwork itself, information related to specific items within the artwork, and/or the cultural aspects of the artwork.

In the case of artwork depicting living creatures, the audio system may provide samples of the sounds made by that particular animal, such as birds chirping, or lions roaring. In the case of sculpture, the audio system may provide the listener with additional information related to how the sculpture was made, who the sculptor was, and perhaps the background story related to the artwork. By merely looking at a sculpture of a historical figure, the individual looking at the sculpture may know very little about that historical figure. The invention provides substantial background material about the historical figure's life and his accomplishments, as well as events that occurred in that time period.

An important feature of the invention is that the audio volume related to the artwork is adjustable. Being able to adjust the volume is important because each gallery or museum has different acoustic environments. In addition, museums and art galleries typically differ in how close or far apart that they may wish to place individual items of artwork. As a result, having adjustable volume control allows the facility showing the artwork to fine tune the performance of the audio system to suit the audio and physical environment of the museum or gallery. An advantage of using adjustable volume controls is that the individual standing in front of the artwork is provided with the best possible audio quality, while at the same time the audio associated with that particular item of artwork is not so loud that it interferes with individuals at increased distance who may be listening to audio associated with a different item of artwork. As a result, the audio volume is adjusted such that audio output related to multiple artworks in a gallery can operate simultaneously without interfering with one another.

The audio enhancement system can be used not only to enhance appreciation of an artwork, but also as an educational tool to both improve an individual's appreciation of that item, and provide them with an incentive to increase their knowledge of a whole field of study. As discussed below, it is one thing to have a sculpture of an individual such as Ptolemy but it is a benefit for an individual hear the story of how he went from being one of Alexander's generals to becoming an Egyptian pharaoh.

Another advantage of the invention is that it encourages individuals to spend a little extra time to appreciate an individual artwork, and to better understand and enjoy it. In the case of a sculpture, there may be many details that can be easily overlooked when merely viewing the artwork. The audio system can encourage the viewer to spend a little extra time examining and the artwork by pointing out and explaining specific details related to that item of artwork.

Having discussed the features and advantages of the invention in general, we turn now to a more detailed discussion of the figures.

Figure 1:
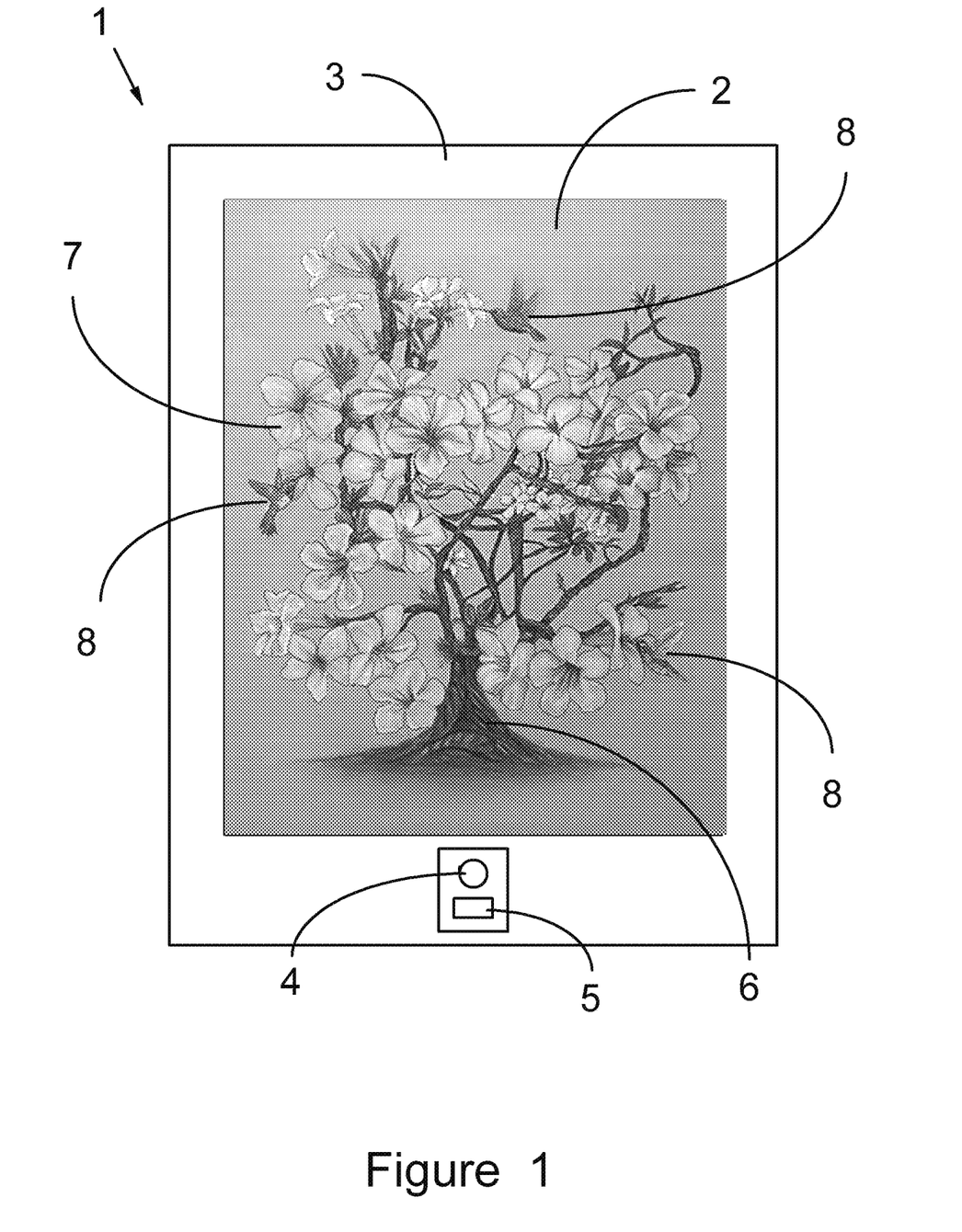
FIG. 1 is a front view of an item of artwork that is combined with an audio system that provides additional information related to aspects of the artwork, such as artist information, sounds related to items in the artwork, information concerning items appearing in the artwork, and/or information related to the use of colors, materials used, etc.

FIG. 1 is a front view of an item of artwork 2 that is combined with a frame 1. In this figure, the audio system 4-5 is incorporated into the picture frame 3. It includes within it a motion detector 4 for detecting the presence of an individual in proximity of the artwork 2. When an individual is detected by the motion detector 4, the audio system activates speaker 5 to output audio information related to the artwork 2. This embodiment illustrates the use of the audio system as an integral part of the frame holding the artwork. While this embodiment permits the audio system to be unobtrusive, those skilled in the art will realize that it also creates a drawback and that it may increase the expense of the frame and the overall cost of displaying the artwork. Subsequent embodiments, discussed below, address this drawback.

Of course, artwork can be used to illustrate any number of situations or items of interest. In many cases, the importance of details and information that can be seen in an item of artwork will not always be obvious to a viewer. The audio enhancement system disclosed herein prevents that from happening by providing a wealth of additional information, external to the artwork itself that increases the viewer's knowledge of the artwork, as well as their appreciation of it.

Figure 2A:
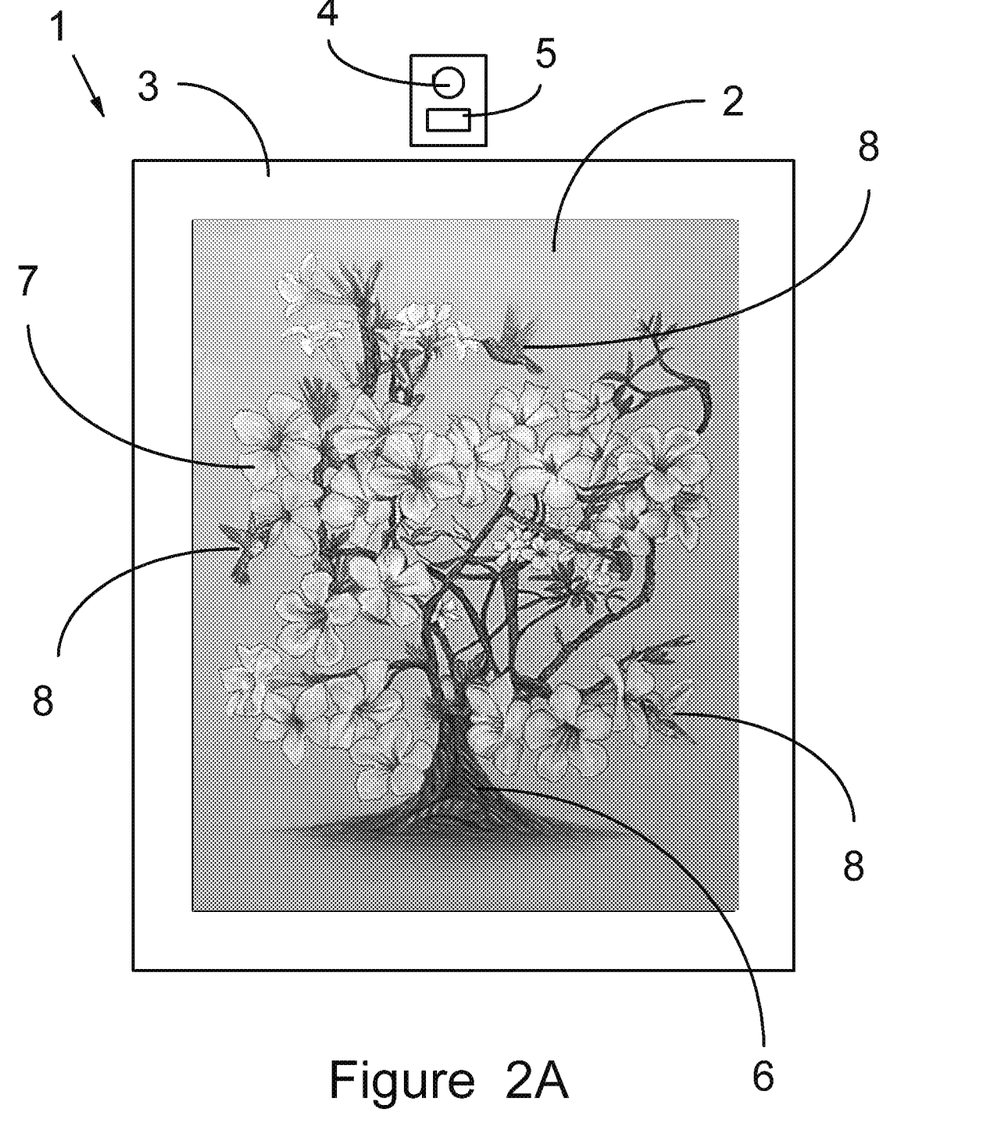
FIG. 2A is an alternative environment of the invention in which the audio system is located near the artwork but not incorporated in the frame or otherwise attached to it. Separating the audio system from the artwork allows the artwork to be changed out without moving the audio system, and vice versa. It further eliminates the need to make any changes to the frame that holds the artwork.

FIG. 2A is a front view of a preferred embodiment of the invention that also uses an audio system 4-5. However, in this figure, the audio system 4-5 is not incorporated into the picture frame 3. It is located in a convenient location above the artwork 1, but is not physically attached to it. This configuration allows the audio system 4-5 to be maintained separately from the artwork 1, and reduces costs associated with integrating it with the frame 3 used to hold the artwork 2. Likewise, this allows the audio system 4-5 to be installed without doing anything in regard to the artwork 1 itself, which may have been previously installed on the walls of the gallery or museum. Further, this also permits the sound system 4-5 to be easily moved from one item of artwork 1 to another, or easily replaced should it become defective. In this figure, the audio system 4-5 is positioned above the artwork 1, however, those skilled in the art recognize that it can be placed in any convenient location so long as it satisfactorily performs its function.

Figure 2B:
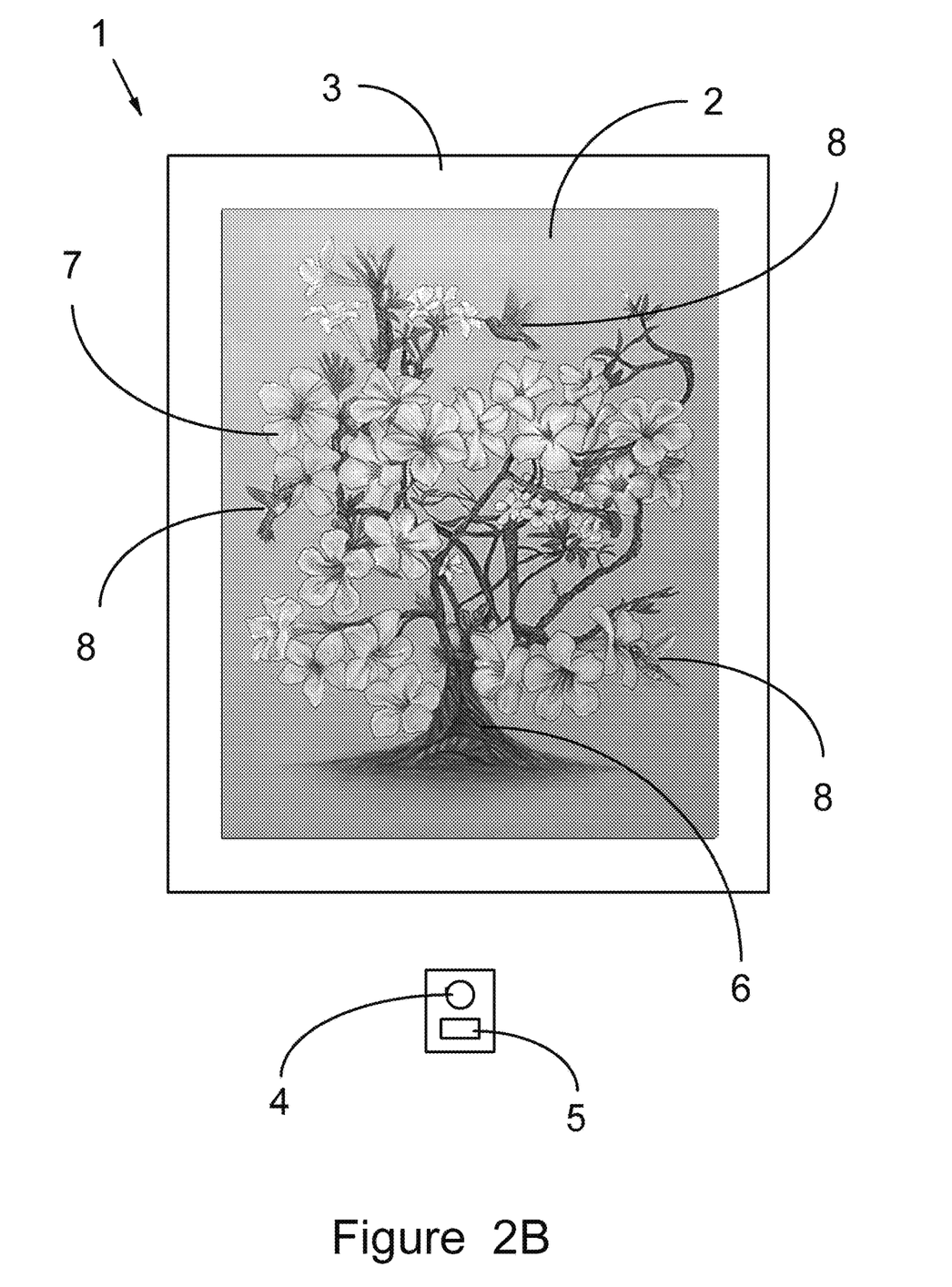
FIG. 2B is an alternative embodiment of the invention shown in FIG. 2A in which the audio system is relocated in relation to the artwork.

FIG. 2B is another alternative embodiment of the invention which illustrates the audio system 4-5 located in a position different than that shown in FIG. 2A. In this preferred embodiment, the audio system 4-5 contains an audio dataset having a preselected audio data file. The audio dataset can be contained within a remote processor 14 (shown in FIG. 4) or preferably downloaded and stored inside the audio system 4-5 itself.

Figure 3:
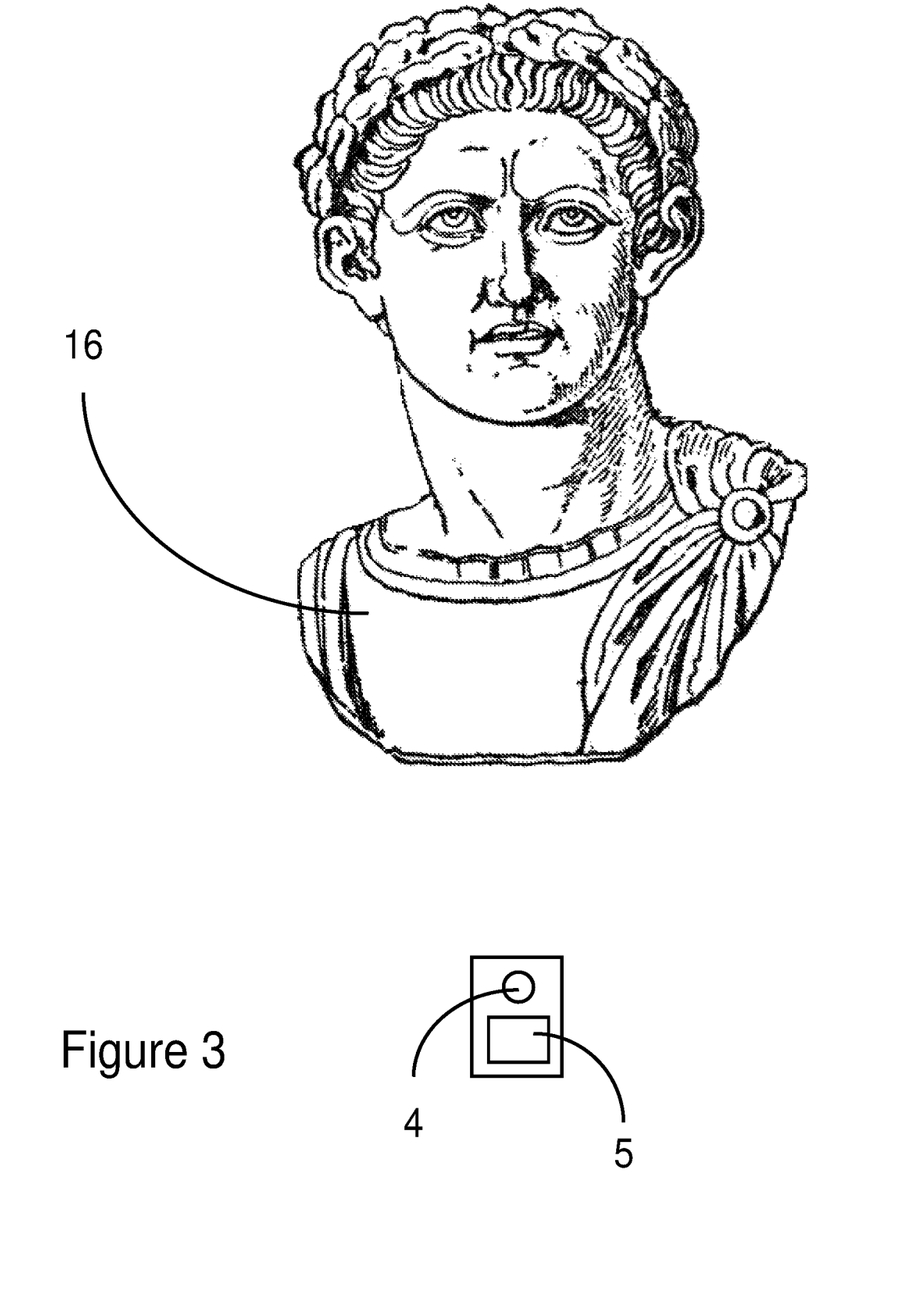
FIG. 3 is an alternative preferred embodiment in which the invention is used to provide information related to a sculptural artwork. In this environment, the components used by the invention are in the vicinity of the sculptural work such that the artwork does not have to be modified to provide audio information.

FIG. 3 illustrates how the invention is used to provide information related to an item of sculptural artwork 16. The particular sculpture 16 selected for this figure illustrates the educational value of the invention. The sculpture of Ptolemy I Soter, standing alone, would perhaps be of only passing interest to individuals. However, while the artwork 16 only shows Ptolemy's physical appearance, the audio data provided by the invention can be used to educate individuals on an important segment of ancient history. For example, the audio data can provide individuals with information about his relationship with Alexander the Great, what happened to the empire when Alexander died, how he founded the Ptolemaic dynasty in Egypt, and how his descendants ruled Egypt for three centuries until his descendant Cleopatra VII lost Egypt to the Romans at Actium. In this case, educating the viewer about the physical appearance of Ptolemy, while simultaneously educating the viewer about his story, reinforces the viewer's understanding and also reinforces the viewer's ability to remember what was learned through the combination of images and sounds. As a result, it is a valuable teaching tool for young (or old) students.

Seeing the sculpture by itself only shows what Ptolemy looked like, while the audio data provides individuals with a wealth of information about history. Further, the image of Ptolemy may even help individuals remember the information in the audio data. This is valuable when teaching subject matter such as history. Quite often, young students find the study of history boring because it is presented as a collection of dates and names of events that feel like the study of statistics. Presenting history by combining art work along with audio descriptions of the people and what they did changes the nature of the study from a dry subject like statistics to something more akin to an action movie, which makes it much easier to understand and remember. That would never be possible by simply using the bust 16 shown in FIG. 3.

While a simple bust of an individual can be enhanced with audio data, the audio data can also be used for any area of art or with other areas of education. For example, while a sculptural masterpiece, such as "The Rape of Proserpina," by Gian Lorenzo Bernini can be appreciated as an individual artwork, the addition of an audio component can vastly expand the individual's appreciation of the sculpture while simultaneously educating the viewer about, and/or introducing the viewer to, Greek and Roman mythology, by explaining the myth behind the sculpture. It can also increase the viewer's respect and appreciation for Bernini, himself, when they realize he was only 23 years old when he completed this masterpiece.

As can be seen, the addition of an audio component can be a powerful educational tool that will enhance an individual's enjoyment of a particular artwork, while also increasing the individual's interest in art, history, nature, or other areas.

Figure 4:
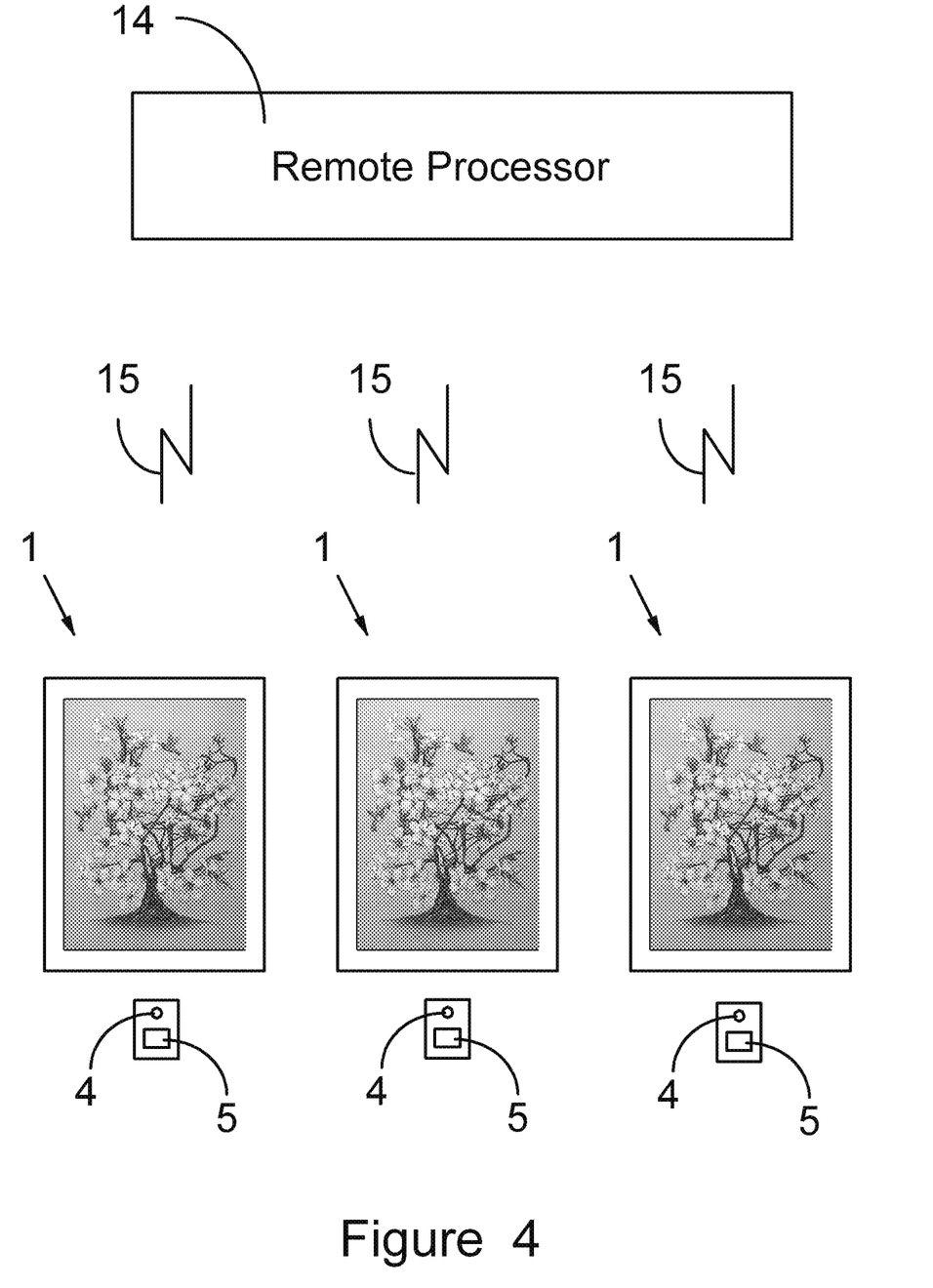
FIG. 4 is a diagram of yet another alternative embodiment of the invention. It illustrates a remote system that communicates with multiple audio systems, each associated with a different item of artwork. Audio data related to each item of artwork is stored in the remote system. The remote system communicates with each item of artwork via wireless connection such as WIFI or Bluetooth.

FIG. 4 is a diagram of yet another alternative embodiment of the invention. It illustrates a remote system 14 that communicates with multiple audio systems 4-5. Audio data related to each item of artwork 1 is stored in the remote system 14. While the remote system 14 could be hardwired to each audio system 4-5, in practice it would be expensive and inconvenient to do this. In the preferred embodiments, the remote system 14 communicates with each audio system 4-5 via wireless connection such as WIFI or Bluetooth. For a large art collection in a museum or gallery, centralizing the data associated with each artwork in a central database in a remote processor 14 facilitates maintenance and updates to the data.

The preferred embodiment envisions a remote processor 14 that has an audio data library that contains the audio data related to each audio system 4-5. In addition, the preferred environment envisions each audio system 4-5 also having its own internal data storage. When an audio system 4-5 is installed for a particular item, the remote processor 14 downloads the audio data to the audio system 4-5. Each audio system 4-5 contains a unique identification code, which along with software that supports a handshaking procedure, allows the remote processor 14 to identify each audio system 4-5. Once a connection is completed between the remote processor 14 and the selected audio system 4-5, the audio data is downloaded to the audio system 4-5 via wireless link 15. At that point, the audio system 4-5 operates independently of the remote processor 14.

Since the remote processor 14 maintains a library of audio data related to each item in the museum or gallery, it provides a central point where all data can be managed and backed up. When a new item of artwork 1 is installed, the audio data only has to be downloaded from the remote processor 14 to an individual item of artwork 1 a single time. As a result, performance at each audio system 4-5 will be maximized since there will be no streaming delays. Further, in the event an audio system 4-5 is defective and needs to be replaced, the audio data can be easily downloaded and installed on the new audio system 4-5.

Figure 5:
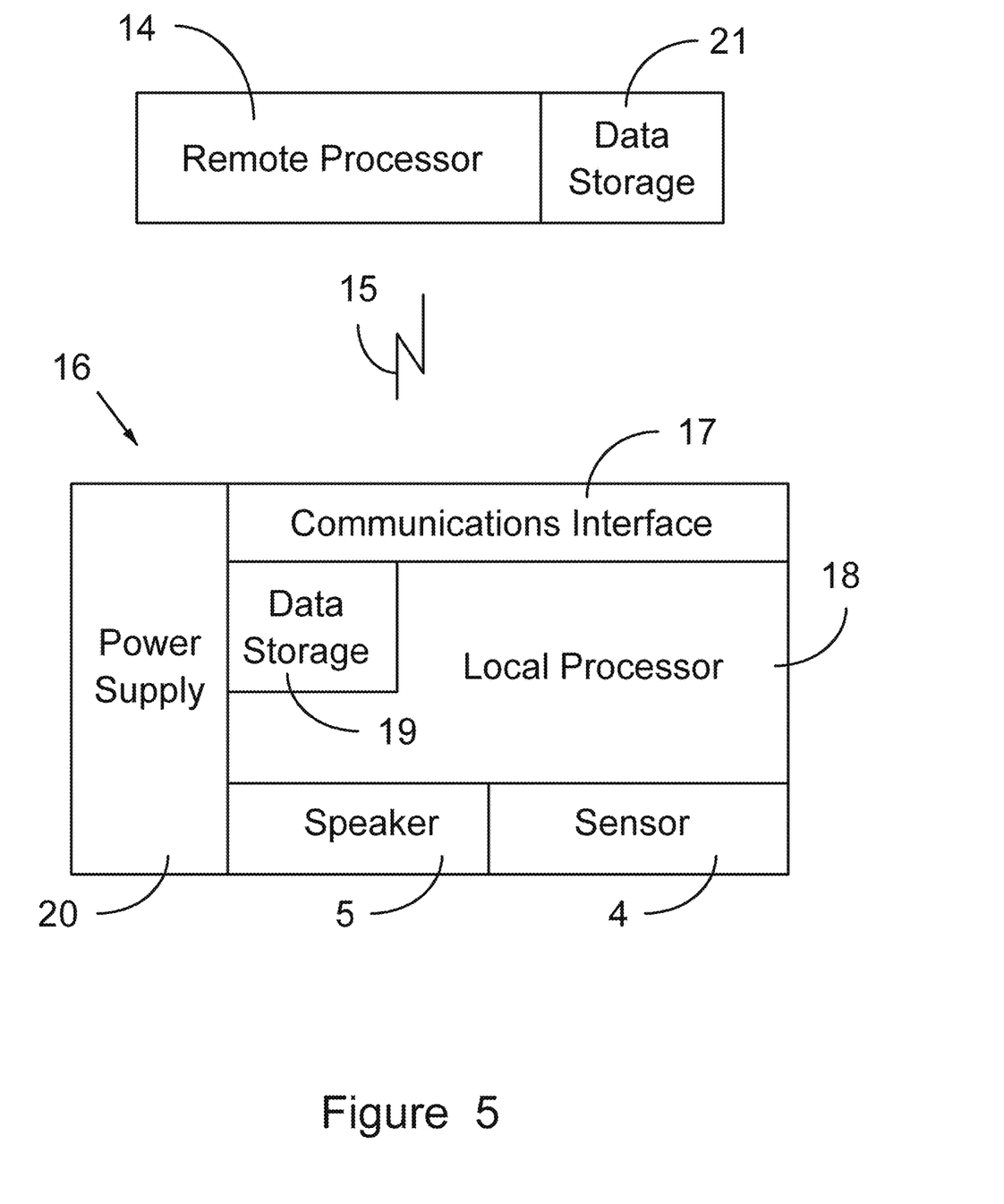
FIG. 5 is a detailed diagram of the audio system used by the invention. It illustrates the additional components which are part of each audio system that is associated with a particular item of artwork. Audio data related to each item of artwork is stored in data storage within the remote system. The remote system communicates with each audio system via wireless connection such as WIFI or Bluetooth.

FIG. 5 is a detailed diagram of individual audio system 16 used by each audio system 16. It illustrates the additional components which are part of each audio system 16 that is associated with a particular item of artwork. Audio data related to each item of artwork is stored in data storage 21 within the remote processor 14. The remote processor 14 communicates with each audio system 16 via wireless connection 15. The wireless connection 15 convey any suitable technology, such as WIFI or Bluetooth, etc. As discussed above, wireless data transfer is preferred over hard wired connections for both cost and convenience reasons.

When a new audio system 16 is installed, the remote processor 14 establishes communications with the communications interface 17 in the audio system 16. The individual audio system 16 has an identification code store in its Data Storage 19. Once the remote processor 14 and the communications interface 17 establish communications link, the initial transfer of audio data from the data storage 21 in the remote processor 14 to the data storage 19 in the audio system 16. In the preferred embodiment, this data transfer only takes place during initial setup or do to planned changes or maintenance. By maintaining a copy of the audio data in data storage 19 possible streaming delays between the remote processor 14 and the audio system 16 are avoided.

Once the audio system 16 is initialized, it can then operate independent of the remote processor 14. During normal operation, the local processor 18 monitors the sensor 4. When the sensor 4 detects the presence of a viewer, it notifies the local processor 18. The local processor 18 then outputs the audio data stored in data storage 19 to the speaker 5.

Also shown in this figure is the power supply 20. While power can be obtained customary plug-in wall socket, the preferred embodiment envisions the use of batteries as the power source. This provides better ease of placement for the audio system 16, and also avoids problems that may occur due to the location of available wall sockets.

While the invention has been described with respect to a preferred embodiment thereof, it will be understood by those skilled in the art that various changes in detail may be made therein without departing from the spirit, scope, and teaching of the invention. For example, the audio enhancement system can be located within a frame or mounted externally, it can have a self-contained set of audio data or have the audio data streamed from a remote processor. Accordingly, the invention herein disclosed is to be limited only as specified in the following claims.

What is claimed is:

1. An audio enhancement system for items of artwork or educational items on display, further comprising:
   one or more audio systems, each audio system further comprising:
      a motion detector that detects the presence of an individual viewing an item;

a dataset containing audio data related to the item; and a speaker for outputting audio data from the dataset that is related to the item, the audio volume in each audio system being independently adjustable to suit its acoustic environment such that, depending on the distance between each artwork, the audio volume for each artwork can be raised or lowered to allow the audio associated with multiple artworks to simultaneously operate without interfering with one another;

the audio system is an integral part of the frame holding the artwork such that the audio system is unobtrusive; and a remote processor, further comprising:
  data storage to store audio data related to each of the audio systems; and
  a communication channel to cooperatively connect to each of the audio systems and to transfer audio data to a selected audio system whereby, the audio enhancement system simultaneously provides audio information related to each item of artwork without the audio information associated with nearby items of artwork interfering with one another.

2. A system, as in claim 1, wherein:
the communication channel is a Bluetooth communications link.

3. A system, as in claim 1, wherein:
the communication channel is a WIFI communications link.

4. A system, as in claim 1, wherein:
the communication channel is an Ethernet communications link.

5. A system, as in claim 1, wherein:
each audio system is associated with an individual item and is physically embedded in the frame uses to hold the artwork or the stand on which the artwork rests.

6. A system, as in claim 1, wherein:
each audio system is associated with an individual item and is located apart from the item.

7. A system, as in claim 1, further comprising:
a power source for supplying power to each audio system.

8. A system, as in claim 1, wherein:
the power sources are hardwired wall plug-in source.

9. A system, as in claim 1, further comprising:
each audio system further comprises an internal battery for supplying power to the audio system.

* * * * *